(12) United States Patent
Gileno (10) Patent No.: US 12,163,585 B2
(45) Date of Patent: Dec. 10, 2024

(54) REDUCTION GROUP

(71) Applicant: CIMA S.p.A., Castenaso (IT)

(72) Inventor: Riccardo Gileno, Castenaso (IT)

(73) Assignee: CIMA S.P.A, Bologna (IT)

( * ) Notice: Subject to any disclaimer, the term of this patent is extended or adjusted under 35 U.S.C. 154(b) by 0 days.

(21) Appl. No.: 18/517,110

(22) Filed: Nov. 22, 2023

(65) Prior Publication Data

US 2024/0209933 A1    Jun. 27, 2024

(51) Int. Cl.
| | |
|---|---|
| *F16H 57/022* | (2012.01) |
| *F16H 1/32* | (2006.01) |
| *F16H 57/02* | (2012.01) |
| *F16H 57/08* | (2006.01) |
| *F16H 1/28* | (2006.01) |
| *F16H 1/48* | (2006.01) |

(52) U.S. Cl.
CPC ............ *F16H 57/082* (2013.01); *F16H 1/32* (2013.01); *F16H 57/02* (2013.01); *F16H 1/2836* (2013.01); *F16H 1/2863* (2013.01); *F16H 1/48* (2013.01); *F16H 2057/02073* (2013.01); *F16H 2057/085* (2013.01)

(58) Field of Classification Search
CPC .......... F16H 57/082; F16H 1/32; F16H 57/02; F16H 1/2836; F16H 1/2863; F16H 1/48; F16H 2057/02073; F16H 2057/085
See application file for complete search history.

(56) References Cited

U.S. PATENT DOCUMENTS

| | | | | |
|---|---|---|---|---|
| 4,158,972 | A | * | 6/1979 | Chamberlain ............ F16H 1/46 475/331 |
| 5,593,235 | A | * | 1/1997 | Gothberg .............. F16C 23/086 384/546 |
| 8,858,382 | B2 | | 10/2014 | Smith |
| 10,458,469 | B2 | * | 10/2019 | Zang ..................... F16C 19/385 |
| 10,830,327 | B2 | * | 11/2020 | Stecker ................ F16H 57/023 |
| 2003/0086631 | A1 | * | 5/2003 | Faltus ..................... F16C 33/60 384/559 |

FOREIGN PATENT DOCUMENTS

| | | |
|---|---|---|
| CN | 206175622 U | 5/2017 |
| DE | 3734462 A1 | 4/1989 |
| WO | WO-2013043822 A2 * | 3/2013 ............ F16C 19/386 |

* cited by examiner

*Primary Examiner* — Justin Holmes
(74) *Attorney, Agent, or Firm* — CANTOR COLBURN LLP (57) ABSTRACT

A reduction group for a vehicle and a reduction assembly including the reduction group are provided. The reduction group has a ring gear, a central sun gear, a planetary gear holder and at least one planetary gear on the planetary gear holder. The at least one planetary gear has a gear meshed externally with the ring gear and internally with the central sun gear, a planetary gear shaft fixed to the planetary gear holder and a pair of bearings supporting the gear on the planetary gear shaft. The planetary gear shaft and the planetary gear holder are engaged so that the planetary gear shaft is axially adjustable on the planetary gear holder in an operational configuration in which the planetary gear shaft performs an axial tightening action on the pair of bearings exhibiting an axial clearance adapted to allow rotation of the pair of bearings.

19 Claims, 6 Drawing Sheets fig.1a fig.1b fig.1a' fig.2 fig.3 fig.4 fig.5

REDUCTION GROUP

CROSS-REFERENCE TO RELATED APPLICATION

This application claims priority to Italian Patent Application No. 102022000026859 filed on Dec. 27, 2022, the contents of which are incorporated by reference in their entirety.

FIELD OF THE INVENTION

The object of the present invention is a reduction group for a vehicle and a reduction assembly that comprises said reduction group.

In other words, the reduction group is adapted to be part of a positionable reduction assembly within a vehicle drive train that from a power group transmits motion to the wheel groups.

BACKGROUND OF THE INVENTION

The term "power group" refers to a group of components adapted to deliver power without any particular limitations, for example, the term "power group" refers to an internal combustion motor group, or an electric motor group or a hybrid motor group and/or, where envisaged, a gearbox group, a transmission group and/or, where envisaged, a differential group.

The term "wheel group" refers to a group of components comprising a wheel without any limitations regarding the form or type of wheel.

In the state of the art, at least one reduction assembly having the purpose of gearing down and reducing the action of the power group before reaching the wheel group is known to be positioned between the power group and the wheel group.

Reduction assemblies are known that comprise a reduction group of the epicycloidal type, that is to say a reduction group in which the speed ratio between the inlet shaft and the outlet shaft varies by means of a series of intermediate gears that comprise a planetary gear holder and planetary gears housed thereupon.

The main issue with said reduction groups is associated with the complicated positioning of said planetary gears on the planetary gear holder.

Specifically, reduction assembly solutions are known in which the planetary gears comprise a gear and a planetary gear shaft whereupon said gear is mounted rotationally free. In such known solutions the gear is mounted on the planetary gear shaft by means of a pair of bearings, and indeed it is the positioning of said pair of bearings that results in specific critical points.

The bearings have to be positioned in a geometrically precise and certain position in time. The execution is therefore required of specific production operations that are such to limit the presence of errors associated with the tolerance and/or use of specific components that are specially selected or processed in order to recuperate said possible errors. For example, in order to recover any dimensional errors the use is known of purposefully processed washers.

SUMMARY OF THE INVENTION

The object of the present invention is to provide a reduction group and a reduction assembly comprising said reduction group that fulfill the needs of the sector and overcome the disadvantages of the prior art.

This object is achieved by the reduction group and the reduction assembly as described and claimed herein. Features entailing further technical advantages are also described.

Therefore, the object of the present invention is achieved by a reduction group for a vehicle positionable between a power group and a wheel group of said vehicle. Preferably, the reduction group extends along a group axis.

Preferably, the reduction group comprises a ring gear.

Preferably, the ring gear is fixed.

Preferably, the reduction group comprises a central sun gear.

The central sun gear, preferably inlet, is adapted to be connected to the power group.

Preferably, the reduction group comprises a planetary gear holder.

The planetary gear holder, preferably outlet, is adapted to be connected to the wheel group.

Preferably, the reduction group comprises at least one planetary gear housed on the planetary gear holder.

Preferably, the reduction group comprises a plurality of planetary gears.

Preferably, each planetary gear comprises a gear that is meshed externally with the ring gear and internally with the central sun gear.

Preferably, each planetary gear comprises a planetary gear shaft that is fixed to the planetary gear holder.

Preferably, the planetary gear shaft extends along a planetary gear axis.

Preferably, the planetary gear axis is substantially parallel to the group axis.

Preferably, each planetary gear comprises a pair of bearings supporting the gear on the planetary gear shaft.

Preferably, the planetary gear shaft and the planetary gear holder are engaged through adjustment means.

Preferably, the planetary gear shaft is adjustable on the planetary gear holder along the planetary gear axis in an operational configuration in which it performs an axial tightening action on the pair of bearings exhibiting an axial clearance adapted to allow the rotation of the pair of bearings.

Furthermore, the object of the present invention, is achieved by a reduction assembly for a vehicle positionable between a power group and a wheel group of the vehicle.

Preferably, the reduction assembly comprises a reduction group as described hereinabove.

Preferably, the reduction assembly comprises a box adapted to contain the reduction group.

Preferably, the box comprises an adjustment opening through which the planetary gear shaft is operable for adjustment.

BRIEF DESCRIPTION OF THE FIGURES

The features and advantages of the present invention will be made readily apparent from the following description of preferred embodiment examples thereof, provided purely by way of non-limiting example, with reference to the accompanying figures, wherein:

FIG. 1a' is a front view of the reduction assembly of FIGS. 1b and 1b;

DETAILED DESCRIPTION

Figure 1A:
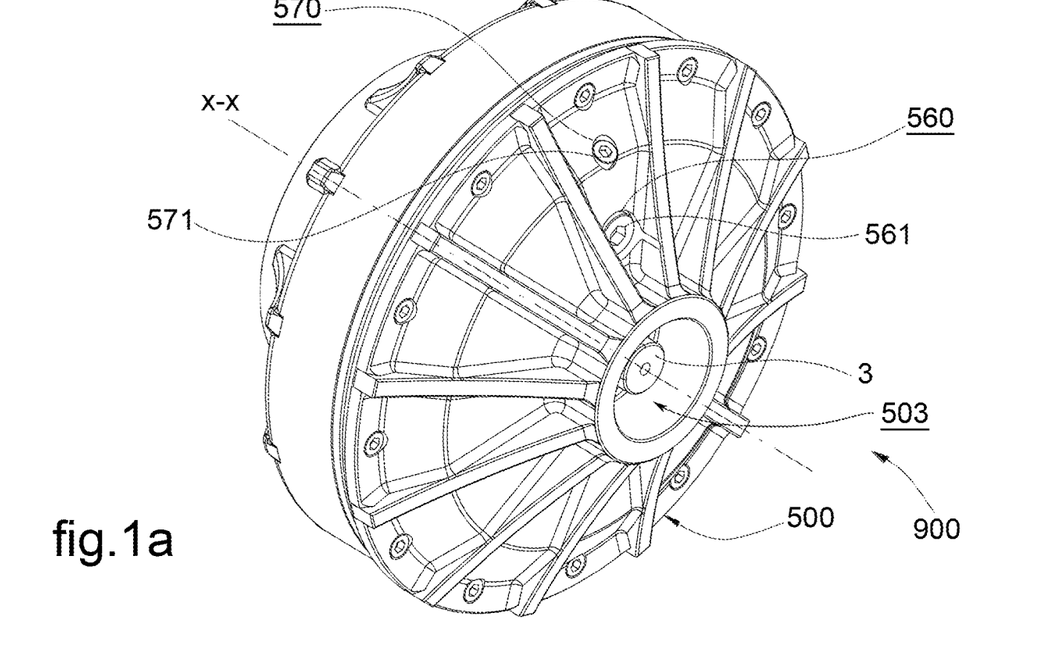
FIGS. 1a and 1b are two perspective views, respectively, of a reduction assembly according to the present invention.
Figure 1B:
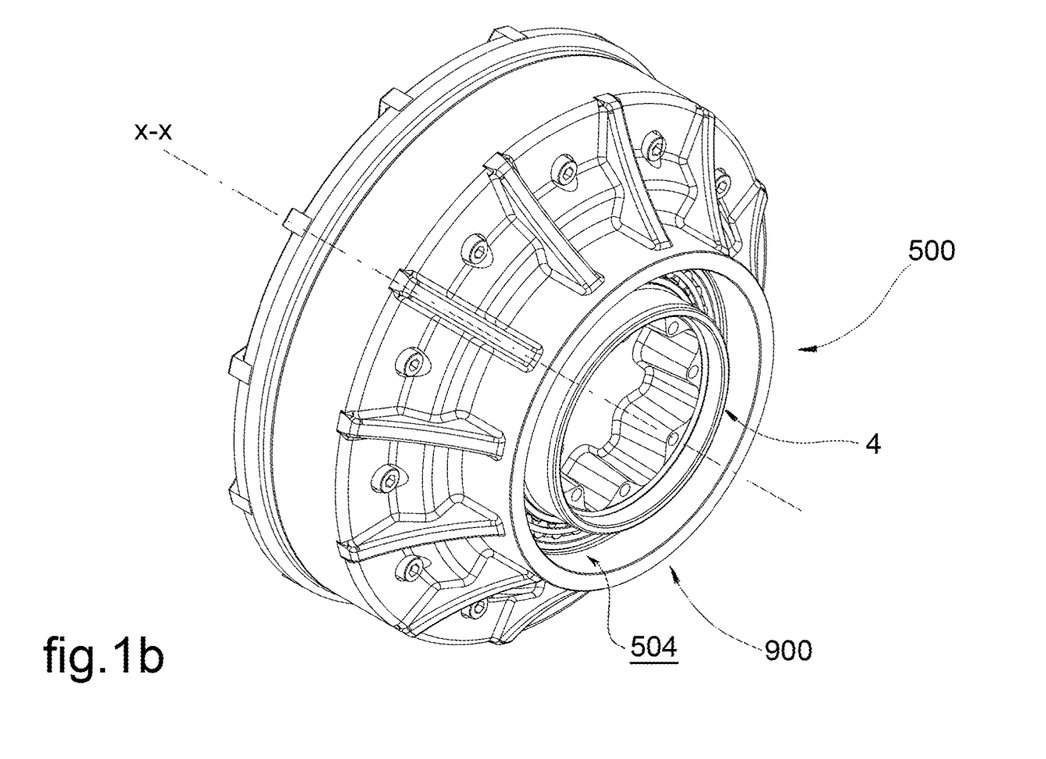
Figure 2:
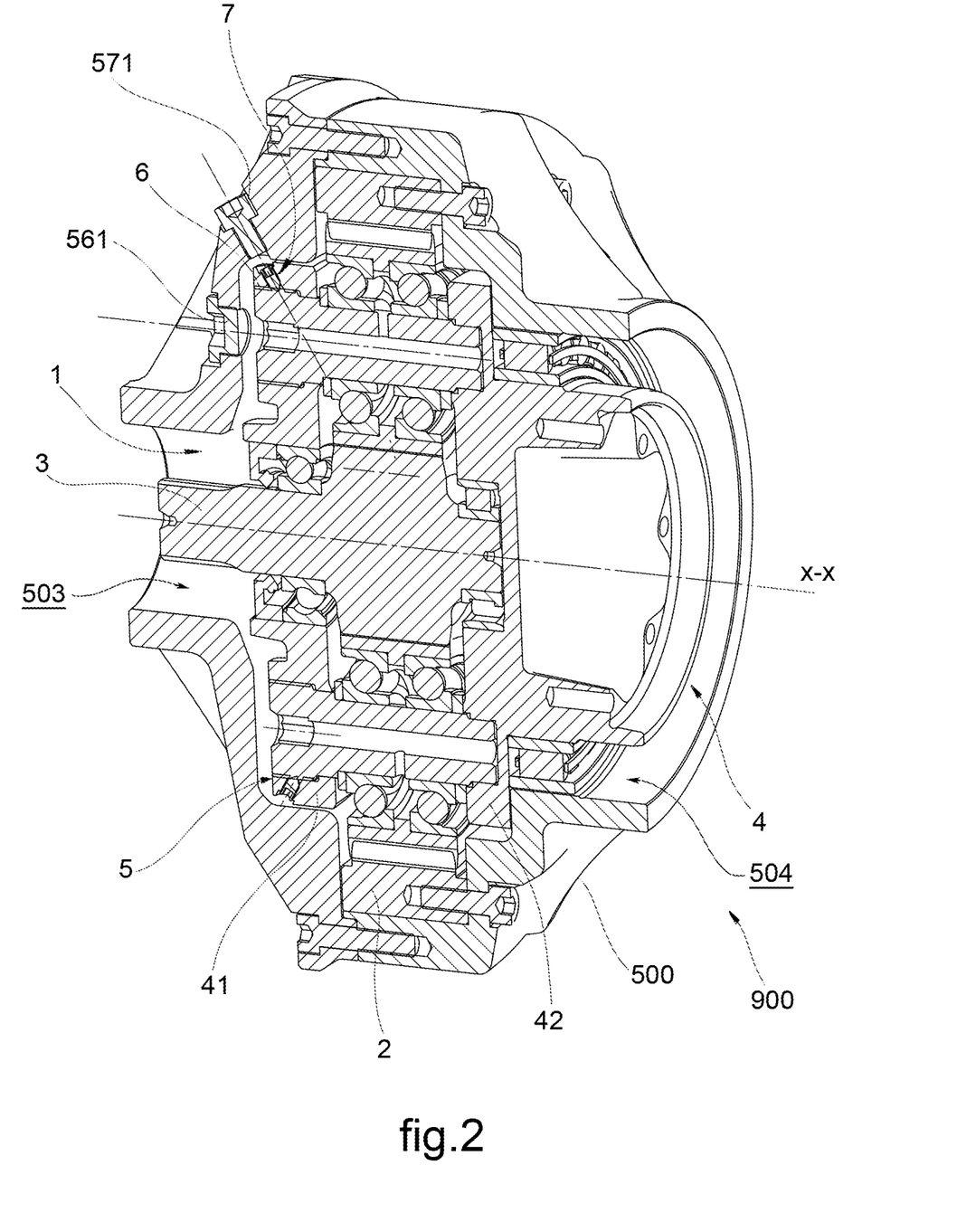
FIG. 2 shows a longitudinal cross-section perspective view of the reduction assembly of FIGS. 1a and 1b.
Figure 3:
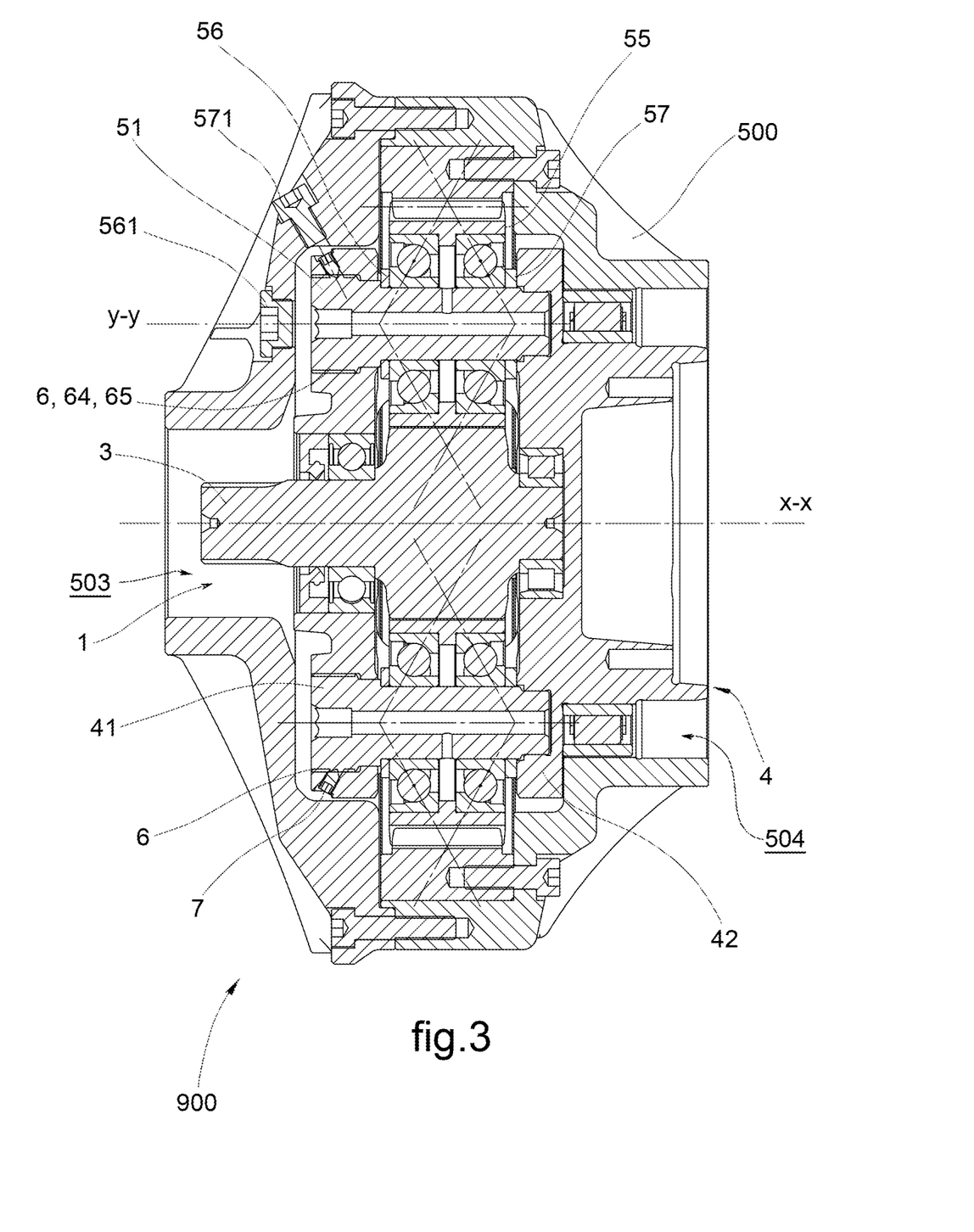
FIG. 3 shows a longitudinal cross-section side view of the reduction assembly of FIGS. 1a and 1b.
Figure 4:
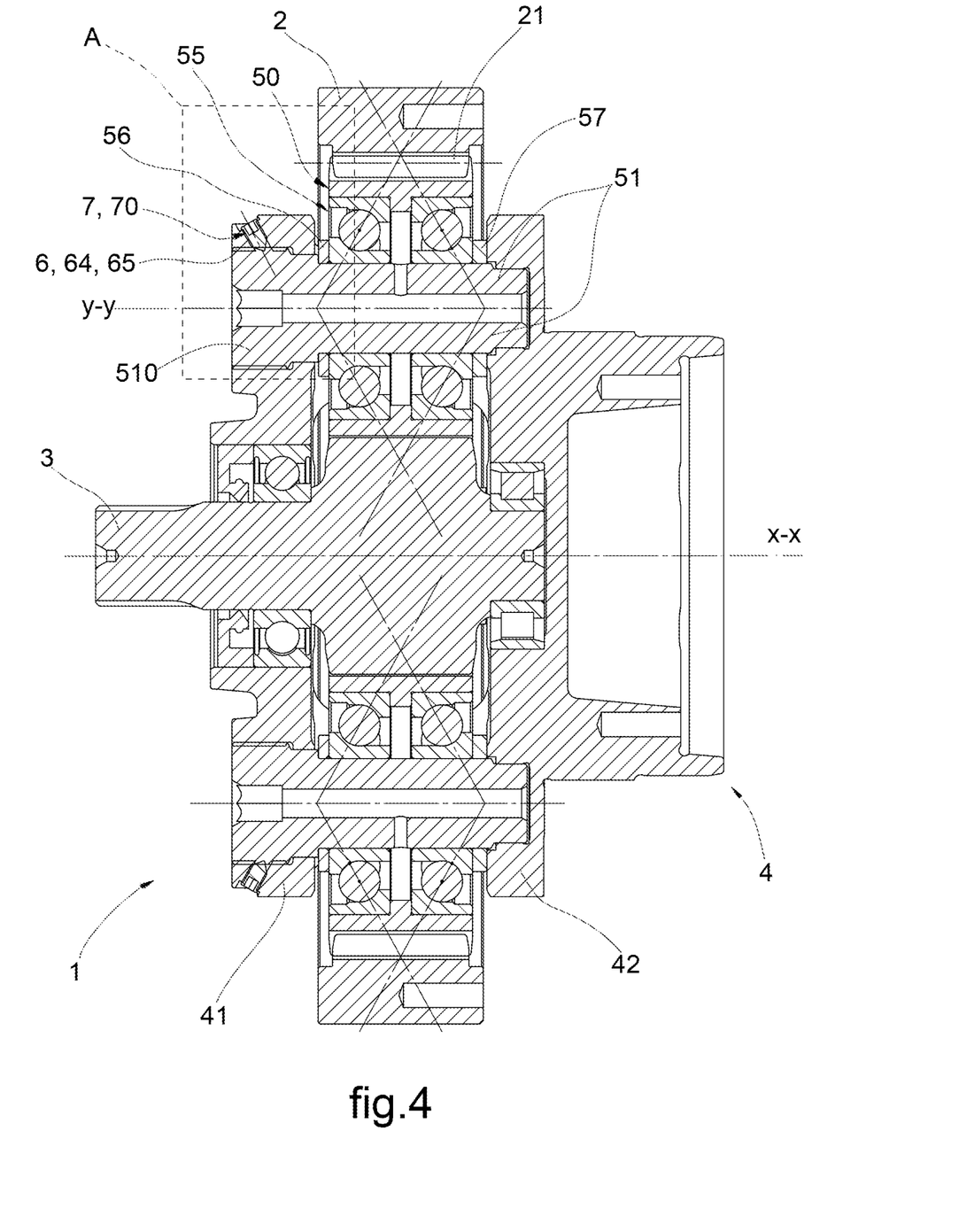
FIG. 4 shows a longitudinal cross-section side view of a reduction group according to the present invention.
Figures 5, 5A:
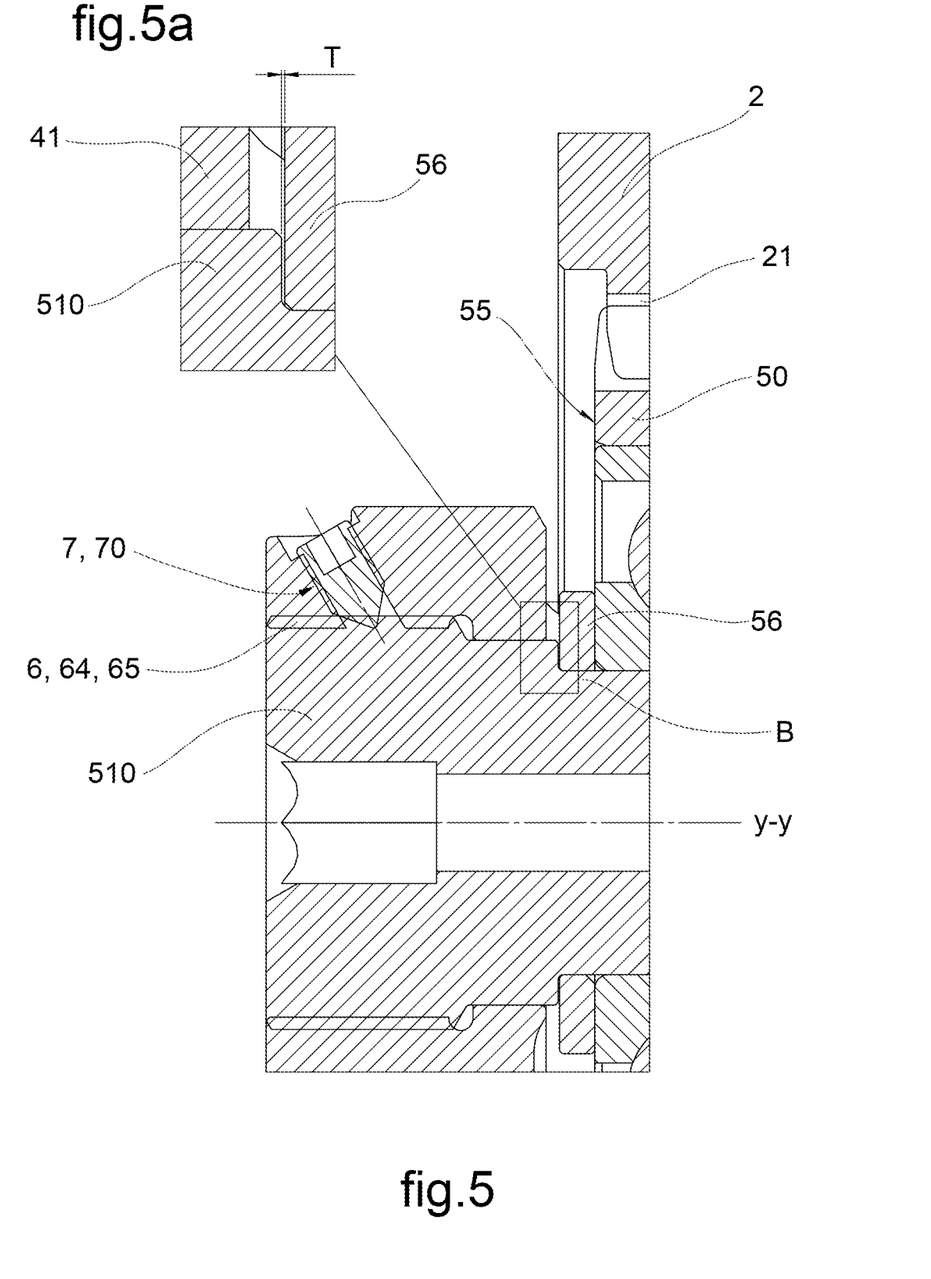
FIGS. 5 and 5a show, respectively, an enlarged view of the area A of FIG. 4 and an enlarged view of the area B of FIG. 5.

With reference to the accompanying figures, a reduction group according to the present invention is indicated in the entirety thereof with the numeral 1.

With reference to the accompanying figures, a reduction assembly that comprises the reduction group 1 according to the present invention is indicated in the entirety thereof with the numeral 900.

According to the present invention, both the reduction assembly 900 and the reduction group 1 are adapted for use in a vehicle and are positionable between a power group and a wheel group of the vehicle.

According to the present invention, the reduction assembly 900 comprises the reduction group 1, and a box 500 adapted to contain the reduction group 1.

According to the present invention, the reduction group 1 extends along the group axis X-X.

Preferably, the group axis X-X is the axis wherealong the drive chain develops.

The reduction group 1 comprises a ring gear 2.

Preferably, the ring gear 2 is fixed.

According to a preferred embodiment, the ring gear 2 is fixed on the box 500.

According to a preferred embodiment, the ring gear 2 is entirely comprised within the box 500.

Preferably, the ring gear 2 comprises an inner tooth 21 radially facing the group axis X-X.

According to the present invention, the reduction group 1 comprises a central sun gear 3. Preferably, the central sun gear 3 is at the inlet of the reduction group 1, being adapted to be connected to the power group.

According to the present invention, the reduction group 1 comprises a planetary gear holder 4. Preferably, the planetary gear holder 4 is at the outlet of the reduction group 1, being adapted to be connected to the wheel group.

Conversely, according to a preferred embodiment, the planetary gear holder 4 is at the inlet of the reduction group 1 whilst the central sun gear 3 is at the outlet of the reduction group 1.

The method of engaging the central sun gear 3 and the planetary gear holder 4 with the power group and the wheel group does not limit the present invention.

According to the present invention, the reduction group 1 comprises at least one planetary gear 5 housed on the planetary gear holder 4.

Preferably, the reduction group 1 comprises a plurality of planetary gears 5. Preferably, the planetary gears 5 are angularly equidistant.

According to the present invention, each planetary gear 5 comprises:
- a gear 50 meshed externally with the ring gear 2 and internally with the central sun gear 3;
- a planetary gear shaft 51, which extends along a planetary gear axis Y-Y substantially parallel to the group axis X-X, fixed to the planetary gear holder 4; and
- a pair of bearings 55 supporting the gear 50 on the planetary gear shaft 51.

According to a preferred embodiment, the bearings of the pair of bearings 55 are positioned in an "O"-shaped arrangement. In other words, the pair of bearings 55 is arranged in such way that the bearings are in a configuration that is also known as "back to back".

Preferably, the bearings are oblique ball bearings.

Preferably, the bearings are roller bearings.

Preferably, the bearings are conical bearings.

According to the present invention, the planetary gear shaft 51 and the planetary gear holder 4 are engaged through adjustment means 6.

The planetary gear shaft 51 is adjustable on the planetary gear holder 4 along the planetary gear axis Y-Y in an operational configuration in which it performs an axial tightening action on the pair of bearings 55 exhibiting an axial clearance T adapted to allow the rotation of the pair of bearings 55.

According to a preferred embodiment, the planetary gear holder 4 comprises a first body 41 and a second body 42 mutually engageable along the group axis X-X by the planetary gear shaft 51.

In other words, the planetary gear shaft 51 has a region engaged with the first body 41 and a region engaged with the second body 42. The axial adjustment of the planetary gear shaft 51 results in the adjustment of the mutual position between the first body 41 and the second body 42.

Preferably, the planetary gear 50 is therefore positioned between the first body 41 and the second body 42.

Preferably, the pair of bearings 55 is positioned between the first body 41 and the second body 42.

By use of the adjustment means 6, the adjustment of the position along the planetary gear axis Y-Y of the planetary gear shaft 51 on the planetary gear holder 4 makes it possible to axially lock the position of the pair of bearings 55, also including an axial clearance T that allows the correct rotation of the pair of bearings 55, without accelerated overheating and/or wear and tear.

According to a preferred embodiment, the planetary gear shaft 51 is adjustable on the planetary gear holder 4 to perform the axial tightening action on the pair of bearings 55 by an action in a first direction and to identify the axial clearance T by an action in a second direction.

In other words, during assembly operations, the planetary gear shaft 51 is operated and adjusted in the first direction and subsequently operated in order to identify the axial clearance T.

According to a preferred embodiment, the adjustment means 6 comprise a threaded coupling 60, the planetary gear shaft 51 comprises a screw 65 and the planetary gear holder 4 comprises a nut screw 64.

In other words, the adjustment is obtained by an adjustment along the threaded coupling 60 of the screw 65 on the nut screw 64.

Preferably, the planetary gear shaft 51 comprises a head end 510 operable to configure the configuration of the planetary gear shaft 51 on the planetary gear holder 4.

Preferably, the head end 510 is operated by a specific tool, for example by a specific screwdriver.

Preferably, the head end 510 comprises a socket engageable by a specific tool.

Preferably, the specific tool and the head end 510 are engaged by hexagonal head coupling, or a hexalobular head coupling (also known as a TORX coupling) or similar.

According to a preferred embodiment, the axial clearance T is between 0.1 and 1 millimeters.

Preferably, the axial clearance T is between 0.2 and 0.8 millimeters.

Preferably, the axial clearance T is between 0.5 and 0.6 millimeters.

According to a preferred embodiment, the reduction group 1 furthermore comprises locking means 7 configurable in a locking configuration in which they engage the planetary gear shaft 51 by locking the axial movement thereof.

Preferably, the locking means 7 are configurable in an adjustment configuration in which they are disengaged from the planetary gear shaft 51, the adjustment of which is allowed along the planetary gear axis Y-Y.

According to a preferred embodiment, the locking means 7 act as a means of safety in preventing unwanted movement of the planetary gear shaft 51.

Preferably, the reduction group 1 comprises locking means 7 for each planetary gear 5, operating on a respective planetary gear shaft 51.

According to a preferred embodiment, the locking means 7 comprise a locking grub screw 70 movable transversely to the planetary gear axis Y-Y.

Preferably, the locking grub screw 70 engages the screw 65 on the planetary gear shaft 51.

According to a preferred embodiment, the locking grub screw 70 is made of copper, deforming itself during the locking action on the planetary gear shaft 51.

Preferably, the locking grub screw 70 is housed within the planetary gear holder 4, preferably within the first body 41.

According to a preferred embodiment, the locking means 7 comprise a lock washer adapted to modify itself in order to perform the action of anti-rotation on the planetary gear shaft 51.

According to a preferred embodiment, the locking means 7 comprise a locknut that rotates in a direction opposite to the planetary gear shaft 51.

Preferably, following the adjustment of the planetary gear shaft 51, configured in the operational configuration, the locking means 7 are operated in order to configure them in said locking configuration in which the planetary gear shaft 51 is locked.

According to a preferred embodiment, the reduction group 1 further comprises a first washer 56 and a second washer 57 positioned on either side of the pair of bearings 55.

Preferably, the first washer 56 and the second washer 57 are, in turn, lowered onto the planetary gear shaft 51, and are adapted to engage the respective outer washers of the first bearing and of the second bearing of the pair of bearings 55. Preferably, the first washer 56 and a second washer 57 are, in turn, lowered onto the planetary gear shaft 51, and are adapted to engage the first body 41 and the second body 42.

According to a preferred embodiment, with particular reference to the reduction assembly 900 of the present invention, the central sun gear 3 and the planetary gear holder 4 are accessible from the box 500.

Preferably, the box 500 has a sun gear opening 503 through which the central sun gear 3 is accessible.

Preferably, the box 500 has a planetary gear holder opening 504 through which the planetary gear holder 4 is accessible.

According to a preferred embodiment, the central sun gear 3 and/or the planetary gear holder 4 project from the box 500.

Preferably, the box 500 comprises an adjustment opening 560 through which the planetary gear shaft 51 is operable for adjustment.

Preferably, the box 500 also comprises a locking opening 570 through which the locking means 7 are operable.

Preferably, the adjustment opening 560 and the locking opening 570 are positioned in relation to the group axis X-X in such a way as to face the respective planetary gear shaft 51 and the respective locking means 7.

According to a preferred embodiment, the box 500 comprises a first cap 561 to close the adjustment opening 560.

Preferably, the box 500 comprises a second cap 571 to close the locking opening 570.

Innovatively, the reduction group and the reduction assembly comprising the reduction group amply fulfill the intended objective, overcoming the issues of the prior art.

Advantageously, the reduction group is simple to produce and simple to assemble.

Advantageously, the reduction group has simple and intuitive installation operations.

Advantageously, the reduction group allows for the adjustment and positioning of the axial clearance during the life cycle thereof.

Advantageously, it is possible to perform simple and intuitive maintenance of the reduction group which during the life cycle thereof is the object of wear and tear, and/or vibration and/or thermal variations and is the object of changes in the operational configuration.

Advantageously, the reduction group, by means of adjusting the planetary gear shaft, recuperates any production tolerances and errors.

Advantageously, the reduction group is adjustable, also when housed within the reduction assembly box.

Advantageously, the reduction assembly, in particular the reduction group comprised therein, is also adjustable when installed on board a vehicle.

Advantageously, the reduction group comprises bearings belonging to classes with not particularly tight tolerances. Advantageously, the reduction group comprises bearings with normal tolerance classes.

Advantageously, the reduction group comprises commercial washers of known thicknesses, without having to perform thereupon specific mechanical operations designed to modify the dimensions thereof.

Advantageously, the reduction group, whilst maintaining a high standard of quality, is economical to produce.

Advantageously, in actuating on the locking means, the reduction group has an elevated safety level, being adjustable, but at the same time maintaining the operational configuration over time and in safety.

Advantageously, the positioning with the "O" arrangement of the bearings belonging to the pair of bearings supporting the planetary gear is handled with simplicity by the reduction group, that is to say by simple adjustment operations on the respective planetary gear shaft.

Obviously, a person skilled in the art may make changes to the invention described above in order to meet contingent needs without departing from the scope of protection as defined in the following claims.

What is claimed is:

1. A reduction group for a vehicle, positionable between a power group and a wheel group of the vehicle, wherein the reduction group extends along a group axis and comprises:
   a ring gear;
   a central sun gear adapted to be connected to the power group;
   a planetary gear holder adapted to be connected to the wheel group; and at least one planetary gear housed on the planetary gear holder, preferably a plurality of planetary gears, comprising:
- a gear meshed externally with the ring gear and internally with the central sun gear;
- a planetary gear shaft extending along a planetary gear axis substantially parallel to the group axis, fixed to the planetary gear holder; and
- a pair of bearings supporting the gear on the planetary gear shaft;

wherein the planetary gear shaft and the planetary gear holder are engaged through adjustment means, and the planetary gear shaft is adjustable on the planetary gear holder along the planetary gear axis in an operational configuration in which the planetary gear shaft performs an axial tightening action on the pair of bearings exhibiting an axial clearance adapted to allow rotation of the pair of bearings;

wherein the adjustment means comprise a threaded coupling, the planetary gear shaft comprises a screw and the planetary gear holder comprises a nut screw.

2. The reduction group of claim 1, wherein the bearings of the pair of bearings are positioned back to back.

3. The reduction group of claim 1, wherein the planetary gear shaft is adjustable on the planetary gear holder to perform the axial tightening action on the pair of bearings by an action in a first direction and to identify the axial clearance by an action in a second direction.

4. The reduction group of claim 1, wherein the axial clearance is between 0.1 and 1 mm.

5. The reduction group of claim 1, further comprising locking means configurable in a locking configuration in which the locking means engage the planetary gear shaft by locking an axial movement thereof.

6. The reduction group of claim 5, wherein the locking means are configurable in an adjustment configuration in which the locking means are disengaged from the planetary gear shaft, an adjustment of the planetary gear shaft being allowed along the planetary gear axis.

7. The reduction group of claim 1, wherein the planetary gear holder comprises a first body and a second body mutually engageable along the group axis by the planetary gear shaft.

8. The reduction group of claim 1, further comprising a first washer and a second washer positioned on either side of the pair of bearings.

9. The reduction group of claim 1, wherein the ring gear is fixed.

10. The reduction group of claim 1, wherein the central sun gear is at an inlet of the reduction group.

11. The reduction group of claim 1, wherein the planetary gar holder is at an outlet of the reduction group.

12. The reduction group of claim 1, wherein the axial clearance is between 0.2 and 0.8 mm.

13. The reduction group of claim 1, wherein the axial clearance is between 0.5 and 0.6 mm.

14. A reduction group for a vehicle, positionable between a power group and a wheel group of the vehicle, wherein the reduction group extends along a group axis and comprises:
- a ring gear;
- a central sun gear adapted to be connected to the power group;
- a planetary gear holder adapted to be connected to the wheel group; and
- at least one planetary gear housed on the planetary gear holder, preferably a plurality of planetary gears, comprising:
  - a gear meshed externally with the ring gear and internally with the central sun gear;
  - a planetary gear shaft extending along a planetary gear axis substantially parallel to the group axis, fixed to the planetary gear holder; and
  - a pair of bearings supporting the gear on the planetary gear shaft;

wherein the planetary gear shaft and the planetary gear holder are engaged through adjustment means, and the planetary gear shaft is adjustable on the planetary gear holder along the planetary gear axis in an operational configuration in which the planetary gear shaft performs an axial tightening action on the pair of bearings exhibiting an axial clearance adapted to allow rotation of the pair of bearings;

wherein the planetary gear shaft comprises a head end operable to configure a configuration of the planetary gear shaft on the planetary gear holder.

15. A reduction group for a vehicle, positionable between a power group and a wheel group of the vehicle, wherein the reduction group extends along a group axis and comprises:
- a ring gear;
- a central sun gear adapted to be connected to the power group;
- a planetary gear holder adapted to be connected to the wheel group; and
- at least one planetary gear housed on the planetary gear holder, preferably a plurality of planetary gears, comprising:
  - a gear meshed externally with the ring gear and internally with the central sun gear;
  - a planetary gear shaft extending along a planetary gear axis substantially parallel to the group axis, fixed to the planetary gear holder; and
  - a pair of bearings supporting the gear on the planetary gear shaft;

wherein the planetary gear shaft and the planetary gear holder are engaged through adjustment means, and the planetary gear shaft is adjustable on the planetary gear holder along the planetary gear axis in an operational configuration in which the planetary gear shaft performs an axial tightening action on the pair of bearings exhibiting an axial clearance adapted to allow rotation of the pair of bearings;

the reduction group further comprising locking means configurable in a locking configuration in which the locking means engage the planetary gear shaft by locking an axial movement thereof;

wherein the locking means comprise a locking grub screw movable transversely to the planetary gear axis.

16. The reduction group of claim 15, wherein the adjustment means comprise a threaded coupling, the planetary gear shaft comprises a screw and the planetary gear holder comprises a nut screw, and wherein the locking grub screw engages the screw on the planetary gear shaft.

17. A reduction group assembly for a vehicle, positionable between a power group and a wheel group of the vehicle, comprising a reduction group positionable between the power group and the wheel group of the vehicle, the reduction group extending along a group axis and comprising:
- a ring gear;
- a central sun gear adapted to be connected to the power group;
- a planetary gear holder adapted to be connected to the wheel group; and at least one planetary gear housed on the planetary gear holder, preferably a plurality of planetary gears, comprising:
- a gear meshed externally with the ring gear and internally with the central sun gear;
- a planetary gear shaft extending along a planetary gear axis substantially parallel to the group axis, fixed to the planetary gear holder; and
- a pair of bearings supporting the gear on the planetary gear shaft;
- wherein the planetary gear shaft and the planetary gear holder are engaged through adjustment means, and the planetary gear shaft is adjustable on the planetary gear holder along the planetary gear axis in an operational configuration in which the planetary gear shaft performs an axial tightening action on the pair of bearings exhibiting an axial clearance adapted to allow rotation of the pair of bearings, and a box adapted to contain the reduction group, wherein said box comprises an adjustment opening through which the planetary gear shaft is operable for adjustment.

18. The reduction group assembly of claim 17, wherein the reduction group further comprises locking means configurable in a locking configuration in which the locking means engage the planetary gear shaft by locking an axial movement thereof, and wherein the box further comprises a locking opening through which the locking means are operable.

19. The reduction group assembly of claim 18, further comprising a first cap to close the adjustment opening, and, possibly, a second cap to close the locking opening.

* * * * *